United States Patent [19]

Schaper et al.

[11] Patent Number: 4,802,925

[45] Date of Patent: Feb. 7, 1989

[54] CONTINUOUSLY OPERABLE CENTRIFUGE FOR MASHING AND CENTRIFUGING OF SUGAR MASSECUITE

[75] Inventors: Helmut Schaper, Brunswick; Heinrich Kurland, Erkerode-Lucklum, both of Fed. Rep. of Germany

[73] Assignee: Braunschweigische Maschinenbauanstalt AG, Brunswick, Fed. Rep. of Germany

[21] Appl. No.: 183,290

[22] Filed: Apr. 11, 1988

Related U.S. Application Data

[63] Continuation of Ser. No. 2,955, Jan. 13, 1987, abandoned.

[30] Foreign Application Priority Data

Jan. 18, 1986 [EP] European Pat. Off. ........ 86710003.4

[51] Int. Cl.[4] .......................... C13F 1/00; B01D 33/00

[52] U.S. Cl. .......................................... 127/19; 127/9; 127/2; 210/377; 494/36; 494/43

[58] Field of Search ............................ 127/9, 19, 2, 13; 210/377; 494/36, 43

[56] References Cited

U.S. PATENT DOCUMENTS

| | | | |
|---|---|---|---|
| 3,956,135 | 5/1976 | Mercier | 210/377 |
| 3,970,470 | 7/1976 | Trojan et al. | 127/19 |
| 3,989,536 | 11/1976 | Werner | 127/19 |
| 4,331,482 | 5/1982 | Schaper | 127/19 |

FOREIGN PATENT DOCUMENTS

| | | |
|---|---|---|
| 544238 | 10/1982 | Australia . |
| 2064351 | 6/1981 | United Kingdom . |

*Primary Examiner*—Curtis R. Davis
*Assistant Examiner*—Chung K. Pak
*Attorney, Agent, or Firm*—W. G. Fasse; D. H. Kane, Jr.

[57] ABSTRACT

A continuously operating centrifugal for mashing and centrifuging of sugar massecuite is equipped with an upwardly, conically opening screen drum (2) which is rotating about a vertical axis (1). The screen drum is carried by a hub (5) reaching into the interior of the drum and supporting at its top a supply and distributing pot (6) for the massecuite and a precentrifuging bell (8) surrounding the distribution pot and reaching into a bottom zone of the screen drum. The precentrifuging bell also has a conical shape opening downwardly. A discharge rim (17) of the precentrifuging bell (8) is surrounded by a mashing ring (9) rotating along with the drum and bell. The mashing ring widens conically and downwardly. Stationary tubular members (14) are provided for supplying the mashing liquid onto the radially inwardly facing surface of the mashing ring (9). The tubular members (14) open toward the ring (9) above a zone on which the mass coming from the bell (8) impinges on the meshing ring for forming a lubricating film of mashing liquid on the surface of the mashing ring which substantially facilitates the mashing.

6 Claims, 2 Drawing Sheets

CONTINUOUSLY OPERABLE CENTRIFUGE FOR MASHING AND CENTRIFUGING OF SUGAR MASSECUITE

This application is a continuation of application Ser. No.: 002,955, filed Jan. 13,1987, now abandoned.

FIELD OF THE INVENTION

The invention relates to a continuously operating operable centrifuge for mashing and centrifuging of sugar massecuite with the aid of a screen drum which is rotatable about a vertical axis and which opens conically in an upward direction in a housing.

DESCRIPTION OF THE PRIOR ART

Centrifuges of this type have a hub supporting the screen drum, whereby the hub reaches upwardly into the interior of the screen drum. The upper end of the hub normally carries a supply and distribution pot. A preacceleration bell is arranged inside the drum and surrounds the hub while opening conically and downwardly. The lower edge of the preacceleration bell reaches into the bottom zone of the drum. A mashing device surrounds the discharge rim of the preacceleration bell. The mashing device comprises a mashing ring surrounding the discharge rim of the preacceleration bell with a spacing. Additionally, stationary mashing liquid supply channels are arranged to open in the zone of the mashing ring for applying mashing liquid to the material on the surface of the mashing ring.

German Utility Model (DE-GM) 79 34 091 discloses a centrifugal of the type described above. In the known centrifugal the mashing ring is either stationary or it is driven to rotate at a small r.p.m. relative to the preacceleration bell. The mashing ring has a C-shape cross-sectional configuration which faces with its open side toward the discharge rim of the preacceleration bell. The mashing liquid supply channels are constructed to rotate with the centrifugal drum and their discharging ports open in the zone of the mashing ring. Thus, the mashing liquid is flung into the mashing ring by centrifugal force.

The prior art structure intends to achieve an intensive mixing of the crystalline mass with the mashing liquid by two features, namely that the preaccelerated crystalline mass emerging from the discharge rim of the acceleration bell is subjected to a braking action when it impinges on the stationary or slowly rotating mashing ring, whereby the braking action reduces the circumferential speed of the crystalline mass. Additionally, introducing the mashing liquid with the rotational speed of the preacceleration bell into the mashing ring contributes to the intensive mixing. These features are intended to provide a gradual filling of the C-shaped cross-section of the mashing ring before the mashed crystalline mass reaches, due to gravity, the bottom of the screen drum of the centrifugal. Centrifugal force then causes the so mixed mass to travel onto the conically widening portion of the screen drum.

In order to achieve the described mixing in the C-shaped cross-section of the mashing ring, and to assure the transfer of the mashed crystalline mass onto the bottom of the screen drum, it is necessary in the prior art device to keep the mashing ring either stationary or to rotate it, at best, with an r.p.m. which is small relative to the r.p.m. of the centrifugal. Rotating the mashing ring at smaller r.p.m.'s requires substantial structural efforts. Therefore, in practice conventional centrifugals are normally equipped with stationary nonrotating mashing rings.

Where massecuite of a medium purity degree is involved, the prior art centrifugals have been quite satisfactory in practice since a single washing operation following the preacceleration is insufficient in connection with such massecuite of a medium degree of purity. Several washing operations are necessary in order to achieve a sufficient separation of the liquid phase from the crystals. However, practice has also shown that centrifugals of the type described are not satisfactorily efficient in their crystal recovery or yield. Due to the braking action mentioned above applied to the crystalline mass emerging from the discharge rim of the preacceleration bell as it enters into the mashing ring, and due to the subsequent re-acceleration, many crystals of the mass are comminuted and pass during the following centrifuging through the screen of the screen drum and are thus discharged with the run-off.

Another disadvantage of the known centrifugals is seen in that problems may occur in the conveying of the massecuite along the screen of the preacceleration bell. That screen faces inwardly and can thus not be visually inspected.

OBJECTS OF THE INVENTION

In view of the foregoing it is the aim of the invention to achieve the following objects and advantages singly or in combination:

to improve sugar centrifugals of the above type in such a way that a sure and uniform feed advance of the massecuite along the screen surface of the preacceleration bell is achieved;

to treat the crystal mass in a gentle way during the mashing and to maintain optimal mashing conditions to thereby improve the crystal yield without any noticeable increase in the energy consumption for driving the centrifugal;

to avoid applying a braking action to the massecuite as it emerges from the discharge rim of the preacceleration bell and to actually accelerate the massecuite to a higher circumferential speed for achieving an intensive and efficient mashing without destroying sugar crystals;

to use some of the mashing liquid as a lubricant on the surface of the mashing ring; and to separate the green run-off from the discharge out of the screen drum of the centrifugal.

SUMMARY OF THE INVENTION

The above objects and advantages are achieved by the combination of the following features. The preacceleration bell of a centrifugal according to the invention has an opening angle which is larger than the opening angle of the screen drum. A mashing ring is mounted for rotation with the bottom of the screen drum. The mashing ring widens conically and downwardly, but has, compared to the preacceleration bell and to the drum, a steeper wall slant. The channels for supplying the mashing liquid are mounted in stationary positions and are provided with discharge openings which are located above the zone where the material impinges on the mashing ring.

The discharge openings of the mashing liquid supplying channels face toward the mashing ring. The lower discharging end of the mashing liquid supplying channels is thus preferably located somewhat above a massecuite discharging rim of the preacceleration bell.

It has been found that a sure conveyance of the massecuite along the screen surface of the preacceleration bell is achieved if the opening angle of the preacceleration bell is larger by about 3° to 14° as compared to the opening angle of the screen drum.

By mounting the conically and downwardly widening mashing ring for rotation with the drum,the invention avoids applying a braking action to the crystal mass that is being transferred from the discharge rim of the preacceleration bell to the mashing ring in the manner of a veil. Rather, the crystal mass distributed as a veil is entrained by the mashing ring due to frictional forces, whereby the veil is accelerated to higher circumferential speeds due to the larger diameter of the mashing ring. Due to the location of the lower discharge openings of the mashing liquid supply channels which are stationary above the impinging zone of the crystal mass on the mashing ring, the mashing liquid forms a film on the mashing ring on which the accelerated or precentrifuged crystalline mass impinges. This film assures a gentle entrainment of the crystalline veil. Thus, comminution of the sugar crystals is avoided, or at least minimized. Further, due to the small difference in the circumferential speeds between the mashing liquid film on the mashing ring and the impinging crystals the resulting gentle entrainment and the further acceleration of the crystalline mass and the mashing liquid by the rotating mashing ring, an intensive intermixing is achieved. During this intermixing the mashing liquid and the crystalline mass travel simultaneously in the direction toward the lower edge of the mashing ring where the intermixed mass is again spread out as a veil in the direction toward the screen drum due to the centrifugal force in the centrifugal.

As mentioned, the liquid film of mashing liquid on the mashing ring forms a lubricant for the crystalline mass impinging on the ring so that damage due to friction caused to the crystals on the mashing ring is substantially prevented. Yet, surprisingly, an intensive intermixing of the crystals with the mashing liquid is achieved due to the different circumferential speeds of the liquid on the ring and the crystals impinging on the ring. Thus, it has been found that a complete enveloping of all crystals by the mashing liquid is achieved along a very short travel distance of the crystals with the mashing ring. This feature has the further advantage that the crystal mass requires a very short residence time on the mashing ring for achieving the desired mashing effect.

For achieving the above purposes or advantages it is suitable if the mashing ring extends downwardly toward the drum bottom only to an extent slightly past the discharge rim of the preacceleration bell. In other words, only a portion of the mashing ring needs to reach below the discharge rim, maximally one half of the mashing ring could reach below the discharge rim. Due to the mentioned larger steepness of the downwardly widening mashing ring, it has been found in practice that the mashing ring needs to reach beyond the discharge rim of the preacceleration bell toward the drum bottom only by about 1 cm or a few centimeters at the most.

In the structure according to the invention the crystal mass needs to travel only a short distance approximately in the axial direction along the mashing ring until it reaches the lower discharge edge of the mashing ring. Thus, the danger of a jamming of the crystal mass or of a local accumulation of crystals is substantially reduced. Practical experience has shown that any local accumulation of crystals does not tend to adhere in a fixed position on the mashing ring due to the cooperation of the mashing liquid with the veil of the crystalline mass. Rather, it has been found that any accumulations, if they occur at all, are immediately entrained by the mashing liquid and transported downwardly in a direction toward the discharge edge of the mashing ring.

According to a preferred embodiment of the invention the mashing ring is surrounded by at least two coaxial rings spaced from one another and from the mashing ring. These two coaxial rings have opposing conicities and form along their large diameter rims discharge edges. These rings are axially displaced relative to each other in such a way that they overlap each other in the axial direction to some extent. This feature of the invention has the advantage that the gentle treatment of the crystal mass that has been achieved according to the invention during the mashing, is continued also during the further advance of the crystal mass intermixed with the mashing liquid. The two coaxial rings form an acceleration device which transfers the mashed material from the mashing ring to the screen of the screen drum, whereby the overlap ondulates the flow.

In the method according to the invention the crystalline mass from which the green syrup or green run-off has been separated by the preacceleration bell,is mashed with the mashing liquid as the crystalline mass impinges on the film of mashing liquid which is continuously formed on the mashing ring by supplying a sugar saturated or super saturated solution to the mashing ring, whereby this solution has a higher degree of purity than the purity of the syrup still adhering to the crystals. Simultaneously, the crystalline mass is accelerated as it impinges on the mashing liquid film on the mashing ring. By using a saturated or super saturated mashing liquid, the invention achieves the substantial advantage that a solving of crystals out of the crystal mass and into the mashing liquid is prevented.

It has been found to be advantageous and practical in most instances to supply to the crystal mass a quantity of mashing liquid corresponding to the quantity of green run-off that was separated by the preacceleration bell. This applies under the condition that the dry substance of the green run-off corresponds approximately to the dry substance of the mashing liquid. This condition is generally satisfied in practice.

Another advantage of the separation of the green run-off or green syrup from the run-off out of the screen drum, as taught by the invention, is seen in that it substantially simplifies the further processing fo the green syrup and the run-off since these have different compositions.

A further advantage is seen in that the present centrifugal is useful for treating massecuite having a wide range of purities, especially starting in a medium range of purity up to higher degrees of purity.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND 0F THE BEST MODE OF THE INVENTION

Figure 1:
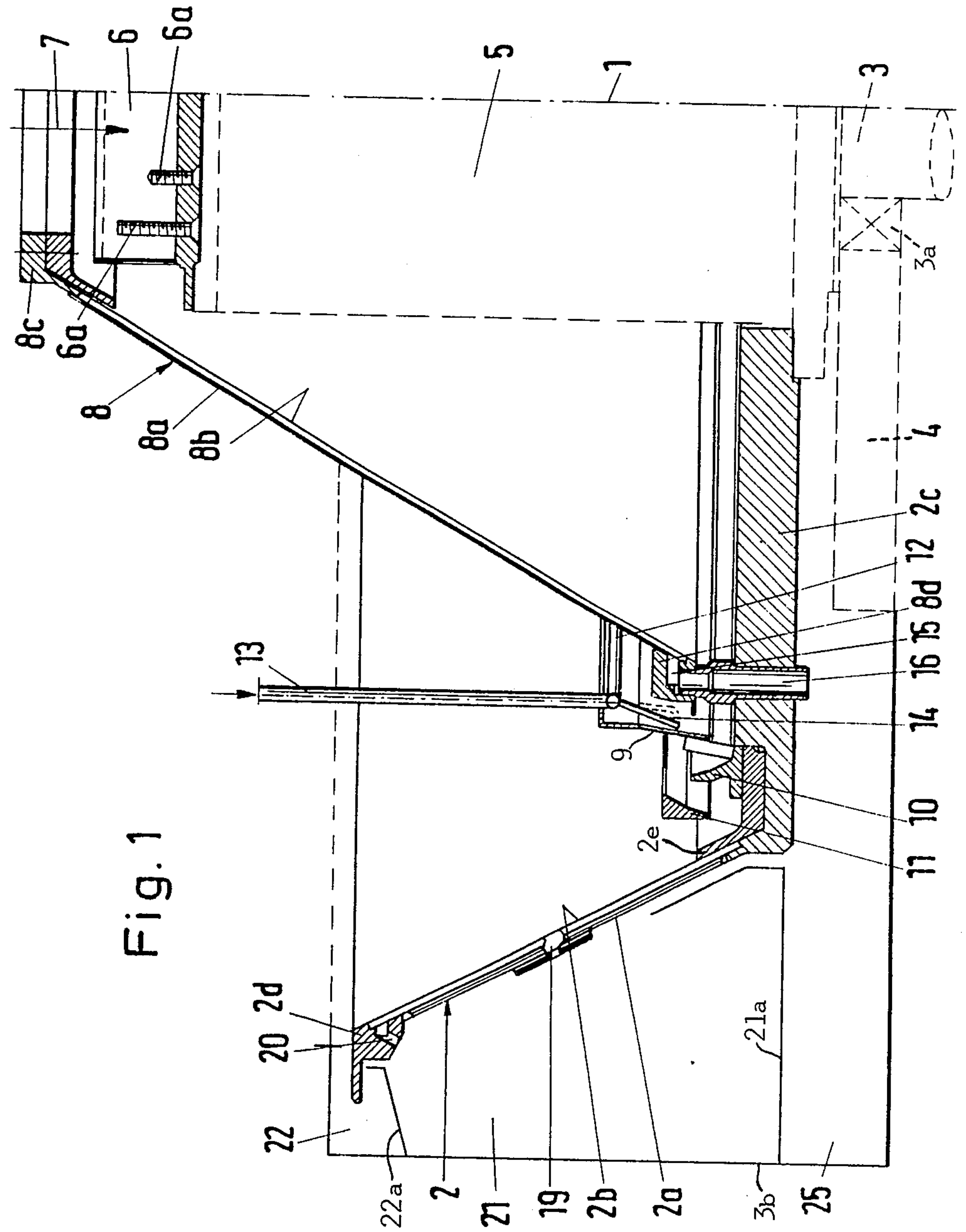
FIG. 1 is an axial longitudinal section through the lower left portion of a centrifugal according to the invention, whereby components unimportant for explaining the invention are shown only schematically and partially by dashed lines.

The centrifugal shown in FIG. 1 in section has a conical screen drum 2 opening upwardly and including a solid drum wall 2a carrying on the radially inwardly facing side a screen 2b spaced from the wall 2a. The wall 2a is secured to a drum bottom 2c which in turn is supported by a hub 5 shown in dashed lines rotatable about a central vertical axis 1. The upper end of the screen 2b is secured to an upper rim ring 2d carried by the drum wall 2a. The lower narrow diameter end of the screen 2b is secured to a screen support ring 2e which in turn is supported by the drum bottom 2c. Both, the upper rim or ring 2d and the lower drum bottom 2c are constructed as relatively solid components. The connections may be accomplished, for example, by welding.

The drive shaft 3 connected to drive components not shown,is mounted in a bearing 3a in a support plate 4 which may also carry the housing 3b. The mounting plate 4 is secured to a machine base or foundation not shown. The hub 5 reaches into and through the drum 2 and may even have an axial length larger than the axial height of the drum 2. The upper end of the hub 5 carries a distribution pot 6 equipped with distribution pins 6a. The massecuite enters into the rotating distribution pot 6 as indicated by the arrow 7. A preacceleration bell 8 having a solid outer wall 8a and a screen wall 8b surrounds the hub and reaches with its downwardly opening end into a zone just above the drum bottom 2c. The preacceleration bell 8 has a conical shape and is mounted with its upper narrow diameter end to a ring "bottom" 8c providing a passage for the massecuite 7. The lower wide end of the preacceleration bell 8 is equipped with a solid mounting ring 8d connected through mounting studs 16a to the drum bottom 2c. The mounting studs 16a are hollow as shown at 16 for communicating a ring space 15 with the collecting space 25 in the housing 3b for the green run-off as will be described in more detail below. The mounting studs 16a are rigidly secured to the drum bottom 2c and are circumferentially distributed along the lower ring 8d of the preacceleration bell 8. Thus, the bell 8 rotates with the drum 2.

Figure 2:
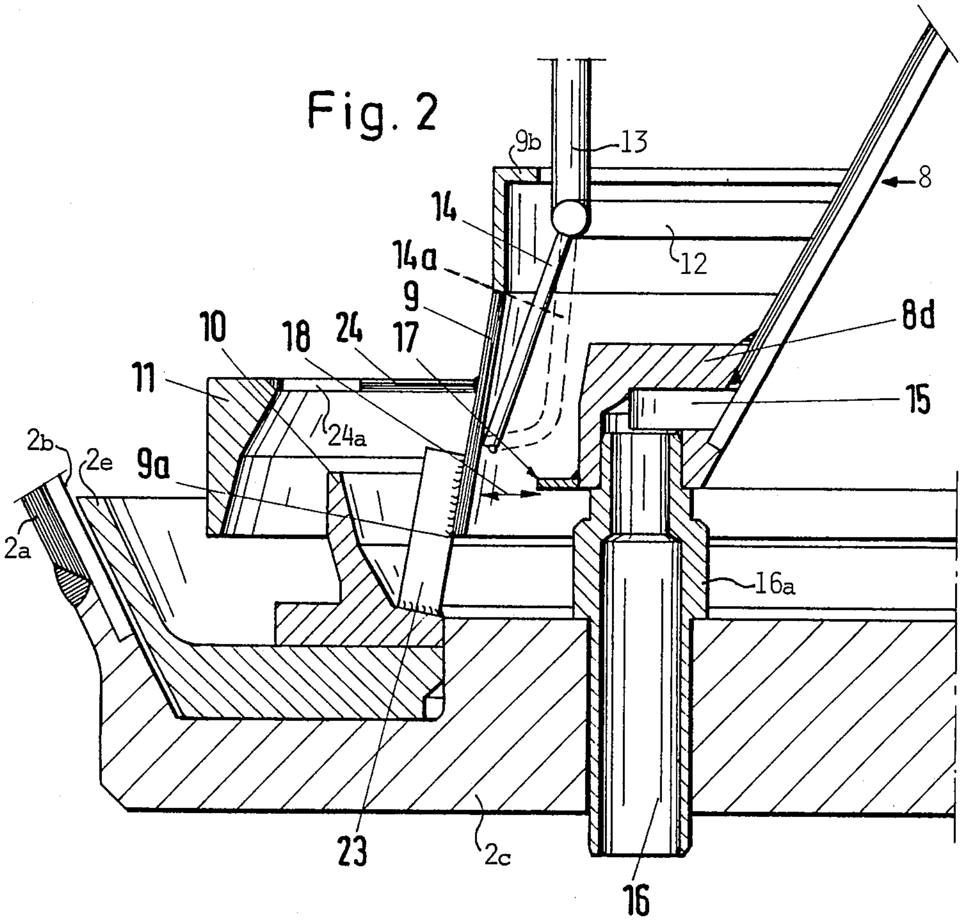
FIG. 2 is an enlarged view of a portion of FIG. 1 showing primarily the details of the mashing ring according to the invention.

According to the invention, the lower ring or rim 8d of the preacceleration bell 8 is surrounded by a mashing ring 9 which in turn is surrounded by two coaxially arranged acceleration rings 10 and 11. These rings 9, 10, and 11 are spaced as shown to provide passages for the material being centrifuged. The rings 9 and 10 have oppositely directed conical surfaces and are axially so displaced relative to each other that there is a certain overlap between the upper edge of the ring 10 and the lower edge of the ring 11 as best seen in FIG. 2. The ring 9 is mounted to the ring 10 by circumferentially distributed struts or mounting legs 23. The ring 10 in turn is rigidly secured to the screen carrying ring 2e resting on the drum bottom 2c. The ring 11 is mounted to the ring 9 by a plate 24 or spokes. Where, instead of the spokes a radially extending mounting plate is used, it has apertures 24a. Welding seams may be used for holding the described components in place. Thus, the rings 9, 10, and 11 rotate together with the preacceleration bell 8 and with the drum 2.

As best seen in FIG. 2, a stationary ring duct 12 connected to a supply pipe 13 for the mashing liquid is mounted between the bell 8 and the mashing ring 9. The pipe 13 may be secured to the cover, not shown, of the centrifugal. Mashing liquid distributing channels in the form of tubular members 14 reach downwardly from the distribution duct 12 to a point just above the discharge rim 17 of the lower ring or rim 8d of the bell 8. The open discharge ends of the distribution members 14 face the inner surface of the mashing ring 9. If desired, the tubular members may have an L-shape as shown at 14a so that the lower end is bent to face with its open port toward the inner surface of the mashing ring 9. The upper end of the mashing ring 9 is formed by a skirt 9b reaching somewhat above the duct 12 to keep the mashing liquid in the space surrounded by the ring 9 with its skirt 9b.

In operation, the massecuite entering in the direction of the arrow 7 into the pot 6 is accelerated and uniformly distributed, whereby the pins 6a assure a uniform and intensive intermixing and homogenization of the massecuite. Centrifugal force causes the massecuite to travel over the upper edge of the pot 6 onto the screen 8b of the preacceleration bell 8. The massecuite then travels from the upper mounting ring or bottom 8c of the bell 8 down in the direction toward the lower rim or ring 8d. Due to the centrifugal force the liquid component or so-called green run-off of the massecuite passes through the screen 8b and travels along the inwardly facing surface of the solid wall 8a of the bell 8 downwardly into the ring space 15. The green run-off then passes through the passages 16 into the collecting space 25 for the green run-off. The collecting space 25 is shown in FIG. 1. The crystalline mass on the other hand passes along the inwardly facing surface of the screen 8b downwardly past the discharge rim 17 of the bell 8 shown in FIG. 2.

Due to the centrifugal force the crystalline mass forms an umbrella-like or veil-like pattern in the area of the arrow 18 in FIG. 2 and impinges on the rotating mashing ring 9. Since the diameter of the mashing ring 9 is larger than the diameter of the discharge rim 17, the circumferential speed of the mashing ring 9 is respectively larger than the circumferential speed of the rim 17. As a result, the veil-like crystalline mass as indicated by the arrow 18 is entrained on the inner surface of the mashing ring 9 and respectively accelerated. As mentioned above, the discharge openings at the lower end of each mashing liquid supply tube 14 or 14a ends slightly above the rim 17. The openings are so directed that the liquid continuously forms a lubricating film on the surface of the mashing ring 9. The formation of this lubricating film is greatly facilitated by the rotation of the mashing ring 9 because the rotation accelerates the mashing liquid, whereby the lubricating film is distributed uniformly over the lower portion of the mashing ring 9 since the mashing liquid flows all the way to the lower edge 9a of the mashing ring 9. Since the mashing liquid is applied to the mashing ring 9 slightly above the rim 17, and since there is a difference in the circumferential speeds of the mashing liquid film on the ring 9 and the crystalline mass 18, an intensive and uniform intermixing of the crystalline mass with the mashing liquid is achieved along a very short distance along the inner circumferential surface of the mashing ring. Thus, the mixing is efficient and the resulting mixture of the crystalline mass and the mashing liquid travels simultaneously toward the lower edge 9a of the ring 9 and then radially outwardly past the struts 23 onto the inner surface of the first acceleration ring 10. Here again, a veil- or umbrella-type formation of the intermixed mass is assured by the centrifugal force. Yet this mixing is very gentle.

As mentioned above, the tubular members 14 or 14a may have any one of several shapes. However, it is important, that the discharge of the mashing liquid takes place just slightly above the impinging zones where the crystalline mass comes into contact with the lubricating film formed by the mashing liquid on the radially inner surface of the mashing ring 9. It is also important that the mashing liquid is applied in such a way to the radially inner surface of the mashing ring 9 that a continuous, uninterrupted film is formed on the entire mashing ring surface below the outlet ports of the tubular members 14, 14a and all the way to the lower edge 9a of the ring 9.

In the light of the foregoing description, it will be noted that the crystalline mass is formed into a veil-type or umbrella-type shape three times, namely first around the lower edge 9a of the ring 9, second, around the upper edge of the ring 10, and third, around the lower edge of the ring 11. The crystalline mass then is applied to the screen 2b of the screen drum 2 where it is covered with a cover liquid as is conventional. The cover liquid is applied along the lower portion of the screen 2b. Referring again to FIG. 1, as the crystalline mass and cover medium travel along the screen,the sugar crystals are separated and travel along the screen 2b and over the upper rim 2d into the sugar collecting space 22 which is separated from the collecting space 21 for the run-off by a sloping ring wall 22a. The run-off passes through the screen 2b and through the openings 19 and 20 in the wall 2a and in the rim 2d respectively for collection in the space 21 which is separated from the space 25 for the collection of the green syrup or green run-off by a bottom wall 21a.

The downwardly opening preacceleration bell 8 has an opening angle which is larger than the opening angle of the screen drum 2. This feature makes sure that the mass travelling along the bell 8 moves downardly toward the rim 8d faster than the mass moving upwardly toward the rim 2d. This feature assures a proper feeding of the massecuite along the bell 8 without the formation of accumulations. This is an important advantage because the inwardly facing surface of the bell 8 cannot be visually inspected without disassembling the centrifugal.

The opening angle of the conical, downwardly opening mashing ring 9 is the smallest compared to the opening angle of the bell 8 and the drum 2. This feature assures that even though the space or distance available for axial travel by the mass along the ring 9 is relatively short, a complete and intensive intermixing of the crystalline mass with the mashing liquid is assured, whereby the intermixing is even enhanced by the formation of the lubricating film of mashing liquid and relatively short residence times of the mass on the mashing ring 9 are achieved. These short residence times caused by the relatively short axial distance to be travelled by the mass is sufficient to prevent the formation of crystal clumps and other accumulations on the mashing ring 9.

Incidentally, by mounting the mashing ring 9 with the aid of the struts 23 at the lower edge of the ring 9, sufficient space is gained for the mounting of the supply means 12, 13, 14, 14a, for the mashing liquid.

The above described arrangement of the rings 10 and 11 makes sure that any interruptions in the veil of the mass caused by the struts 23 are smoothed out again so that the final veil reaching the screen 2b of the drum 2 is continuous and uninterrupted. Instead of using two acceleration and smoothing rings 10 and 11 as shown, a larger number of such rings may be provided. All of these rings would be mounted as shown and cause an ondulating travel pattern of the mass through the channel formed by these rings.

The use of a mashing liquid that is sugar saturated or even super saturated, has the advantage that solving of the sugar crystals in the crystalline mass is avoided.

Practical experience has shown that the quantity of mashing liquid should correspond approximately to the quantity of the green syrup or run-off that has been separated from the massecuite because normally the dry substance of the green syrup or green run-off corresponds approximately to the dry substance of the mashing liquid. However, if the dry substance content of the green syrup and of the mashing liquid differ substantially from each other, it is necessary to change the quantity ratio of the green run-off relative to the mashing liquid to obtain the required flowability of the mashed crystall mass.

Although the invention has been described with reference to specific example embodiments, it will be appreciated that it is intended to cover all modifications and equivalents within the scope of the appended claims.

What we claim is:

1. A continuously operable centrifuge for mashing and centrifuging of sugar massecuite, comprising a vertical axis (1), a hub (5) rotatable about said vertical axis, a screen drum (2) and means mounting said screen drum to said hub for rotation about said vertical axis, said screen drum opening conically in an upward direction, said hub (5) reaching upwardly into the interior of said screen drum, massecuite filling and distributing means (6) mounted on top of said hub, downwardly opening conical precentrifuging acceleration bell means (8) mounted for rotation with said hub and reaching downwardly toward a bottom zone of said screen drum, said precentrifuging acceleration bell means (8) comprising a solid wall (8a) having an upper inlet end and a lower open discharge end, and a screen (8b) supported on said solid wall with a spacing between said solid wall and said screen (8b), a ring space (15) surrounding said lower discharge end of said solid wall (8a) for receiving liquid green run-off in said ring space (15), liquid discharge passages leading into said ring space for removing said green run-off, said precentrifuging acceleration bell means further comprising at its lower open discharge end a discharge rim (17) for discharging a precentrifuged crystalline mass, mashing means comprising a mashing ring (9) surrounding said discharge rim (17) with a radial spacing, said mashing ring (9) having a lower rim (9a) reaching close to a bottom of said screen drum (2), stationary mashing liquid supply means (14) having mashing liquid discharge openings extending to a level above said discharge rim (17) for supplying mashing liquid onto said mashing ring (9), said acceleration bell means having an opening angle larger than that of said screen drum (2), means mounting said mashing ring (9) for rotation with said hub, said mashing ring opening downwardly with a conical slope which is steeper than that of said screen drum and steeper than that of said precentrifuging acceleration bell means, and wherein said mashing liquid discharge openings of said stationary mashing liquid supply means (14) face in a direction toward a radially inner surface of said mashing ring (9) at a level above a zone on which said precentrifuged crystalline mass from said discharge rim (17) impinges on said mashing ring (9).

2. The centrifuge of claim 1, wherein said mashing ring (9) has an upper edge, a lower edge, and such an axial dimension between said upper and lower edges is such that said mashing ring extends downwardly below said discharge rim (17), in a direction toward said screen drum mounting means forming a drum bottom (*2c*)

3. The centrifuge of claim 2, wherein said mashing ring (9) extends below said discharge rim (17) by at least about 1 cm up to about 50% of said axial dimension of said mashing ring.

4. The centrifuge of claim 1, wherein said mounting means for said mashing ring (9) comprise circumferentially distributed struts (23) securing said mashing ring (9) to said mounting means of said screen drum (2) forming a drum bottom.

5. The centrifuge of claim 1, further comprising an acceleration device surrounding said mashing ring (9), said acceleration device including at least two coaxially arranged, spaced acceleration rings (10, 11), each having a conical surface and a larger diameter discharge edge, said rings being axially displaced relative to each other and arranged in such a way that the rings overlap each other in the axial direction, said conical surfaces having opposing each other.

6. The centrifuge of claim 5, wherein said acceleration device comprises at least one ring with an upwardly widening opening and at least one ring with a downwardly widening opening, first securing means (24) for attaching said upwardly widening ring for rotation with said hub, and second securing means for attaching said downwardly widening ring to said mashing ring (9) also for rotation with said hub.

* * * * *